July 15, 1969         P. R. SMITH, JR         3,455,451
           SHALLOW CELL AND PROCESS FOR FROTH FLOTATION
Filed Aug. 4, 1966                                 5 Sheets-Sheet 1

INVENTOR
PAUL R. SMITH JR.

BY

ATTORNEY

—INVENTOR
PAUL R. SMITH JR.

BY Charles L. Harness

ATTORNEY

July 15, 1969            P. R. SMITH, JR            3,455,451

SHALLOW CELL AND PROCESS FOR FROTH FLOTATION

Filed Aug. 4, 1966            5 Sheets-Sheet 3

— INVENTOR
PAUL R. SMITH JR.

BY *Charles L. Harness*

ATTORNEY

INVENTOR
PAUL R. SMITH JR.

BY Charles L. Harness

ATTORNEY

United States Patent Office 3,455,451
Patented July 15, 1969

3,455,451
SHALLOW CELL AND PROCESS FOR
FROTH FLOTATION
Paul R. Smith, Jr., Arvada, Colo., assignor, by mesne assignments, to W. R. Grace & Co., Clarksville, Md., a corporation of Connecticut
Filed Aug. 4, 1966, Ser. No. 570,310
Int. Cl. B03d 1/02
U.S. Cl. 209—104                                    12 Claims

ABSTRACT OF THE DISCLOSURE

The invention is directed to a shallow flotation cell in which the air bubbles are supplied by passage of air through a sintered metal plate, and to process for using the cell.

---

The present invention is directed to a novel froth flotation cell and to a novel froth flotation process.

In summary, the froth flotation cell of this invention comprises in combination a shallow box, an air pressure chamber (or aerator box) topped by a sloping porous aerator plate, feed means at the back of the box, an overflow lip or weir at the front of the box for the removal of froth-floated concentrate, and collection means at the bottom of the box for collection of non-float material. The porous aerator plate is suitably made of sintered metal powder, preferably stainless steel, the pores having a mean diameter in the range of 2 to 65 microns. Such plates are well-known and are commercially available. Equivalent non-metallic (e.g., ceramic) porous plates are also suitable. The degree of slope of the aerator plate is not critical, but nevertheless should satisfy two operational requirements. The first requirement is that the slope must be sufficient to cause the non-floating material to slide off the plate readily to permit collection and to avoid build-up on the plate which would interfere with uniform release of air bubbles from the plate. The second requirement is that the slope not be so steep as to form a "circular" flow of bubbles in the cell, e.g., up the slope to a wall of the cell, along the surface to the opposite wall and down again. To preserve the necessary flow of the bubbles from the surface of the aerator plate substantially straight up to the surface of the water, with only minor eddying and swirling, the slope of the plate should normally not exceed about 60° from the horizontal. A slope in the range of 15–60° C. is generally operable; about 30° is preferred.

Two other features of the cell are essential.

First, the overflow lip is only a few inches above the aerator plate. This results in a shallow cell and offers striking advantages, namely, the individual bubbles do not have far to travel before reaching the zone of feed particles, and therefore have less opportunity to collide and coalesce with each other. Small bubble size (and the number of individual bubbles) is thereby largely preserved, thereby increasing the probability of bubbles-mineral particle contact, since such contact is proportional to the product of the number of bubbles and the number of particles in a given volume. The average height of the exit lip (or weir) above the aerator plate should be about 4 to 12 inches, and preferably about 6 inches. By "average height" is meant, in the case of a straight sloping aerator plate, one-half the sum of the depths of the shallow end and the deep end.

Second, the length of forward flow is important. To reap the full advantage of the invention, this must be kept to a minimum. Good separation is obtained within the first few inches of forward flow, and it is pointless to retain the froth layer in the cell after good separation is accomplished. The distance between the feed entry and the exit weir should be about 4 to 18 inches. A distance of about 12 inches gives excellent results in most cases.

The process of this invention involves, in summary, (1) establishing a froth layer in water containing a frothing agent, in which the froth is created by bubbles issuing from orifices 2–65 microns mean diameter through an average depth of water 4 to 12 inches; (2) laying a particulate feed mixture comprising a floatable reagentized component and a sinking component on said froth layer, whereby the froth becomes attached to the floatable reagentized component and whereby the sinking component sinks through the froth down into the water; (3) collecting the froth (containing the floatable reagentized component) at a distance of about 4 to 18 inches from the point when the feed is put on the froth; and (4) collecting the sinking component.

The size of the bubbles generated by the cell of this invention is quite small. Photomicrographs taken through the side of a transparent model operated at 3 p.s.i.g. showed (for an average of 6 runs) a bubble count of about 57 per linear inch, or about 3250 per square inch, or about 185,250 per cubic inch of water plus bubbles. (The frother was methyl isobutyl carbinol, 0.95 cc./gal. of water. The mean diameter of the orifices in the aerator plate was 5 microns.) The bubbles/water ratio is (typically) only about 14%, which compares with a figure of about 19% for a mechanically agitated cell. The above figures are offered as being merely typical, and different air pressure, different aerator plates, and different frothing agents will affect bubble size and total bubble volume.

About 0.56 cu. ft. of air (as bubbles) per minute flows through the aerator plate of the cell of FIG. 1, when operated at 3 p.s.i.g. Since the aerator plate was 6 by 12 inches, this is equivalent to 0.0078 cu. ft. of air per minute per square inch of plate. Variations in air pressure will of course give different rates. In general, 1–10 p.s.i.g. air pressure is operable, giving about 0.004 to 0.05 cubic feet of air per minute per square inch of plate.

FIGS. 3–6 inclusive are additional perspective views of the cells within the scope of this invention, showing various arrangements of the aerator box and aerator plates.

Figure 7:
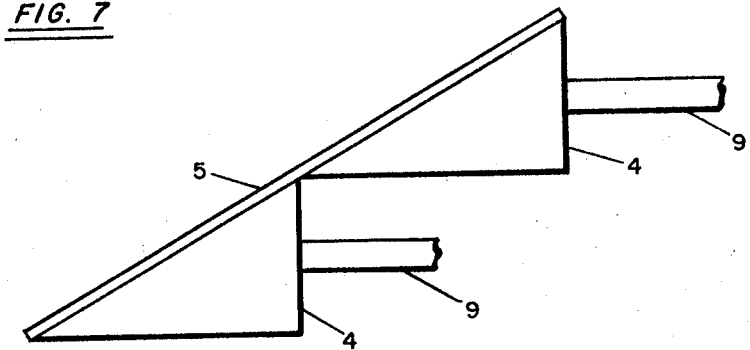

FIG. 7 shows an embodiment of a compartmentalized aerator box in elevation.

Figure 8:
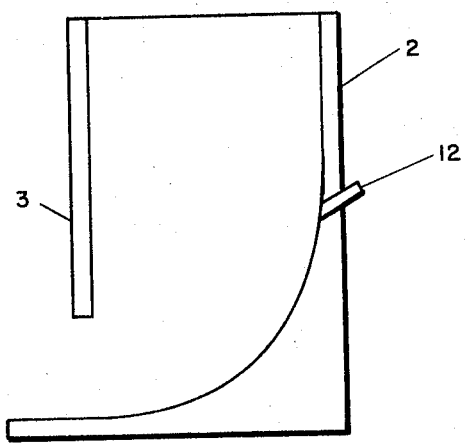

FIG. 8 shows a view in elevation of an embodiment of the feed box of the cell of this invention.

In the figures, like numbers refer to like parts.

Figure 1:
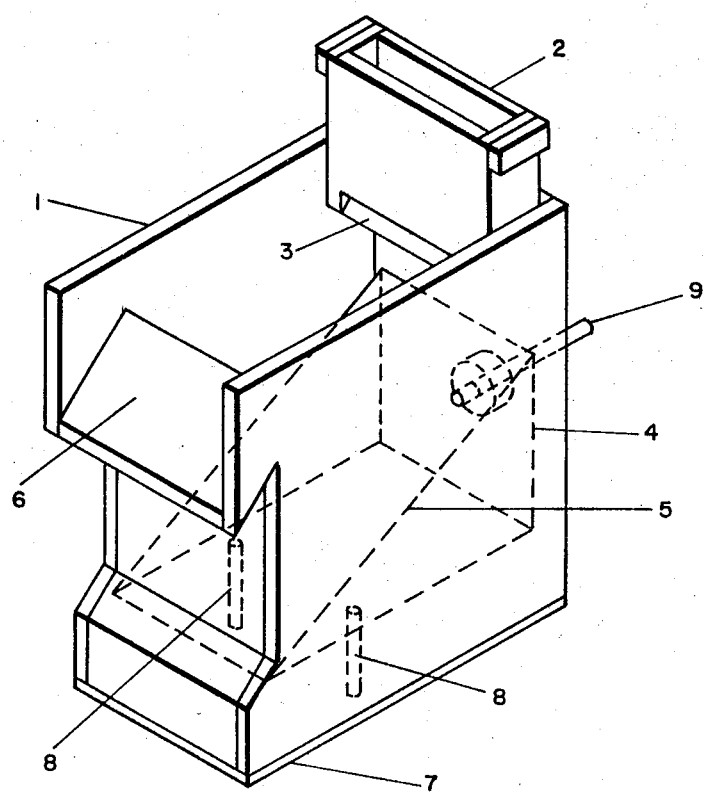
FIG. 1 is a perspective view of one form of the flotation cell of this invention, suitable for batch operation.

Referring to FIG. 1, the outer container portion of the cell is shown generally at 1; feed box or feed entry at 2; feed exit slot at 3, aerator box at 4, porous aerator plate at 5; and overflow weir at 6. An air inlet pipe 9 connects to aerator box 4. In the embodiment shown, the aerator box 4 stands away from the floor 7 of the cell 1 and rests on supports 8. As shown in FIGS. 1–6, the overflow weir 6 may overhang somewhat to facilitate collection of concentrate by collection chute or conveyor belt (not shown).

Figure 2:
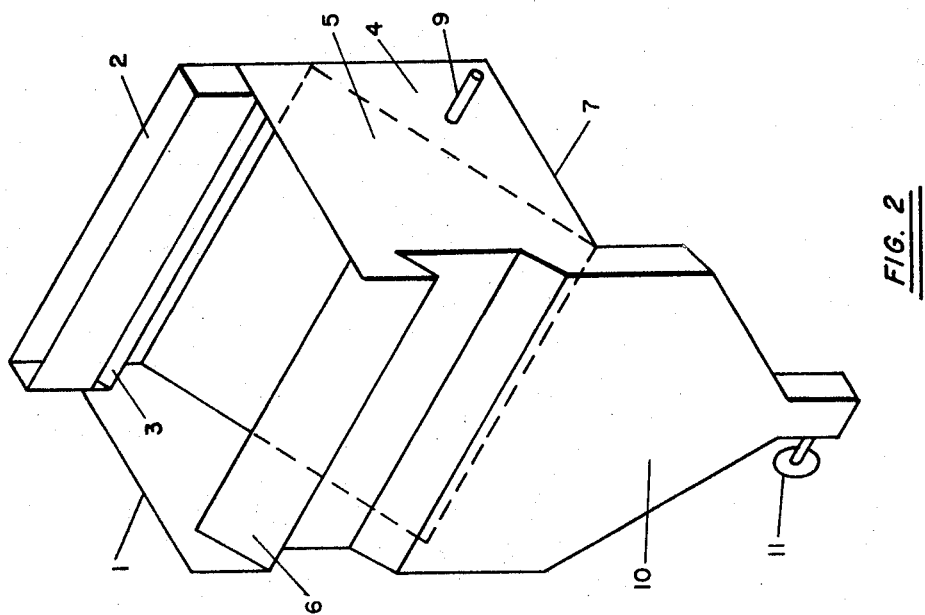
FIG. 2 is a perspective view of another form of the flotation cell of this invention, suitable for continuous operation.

The apparatus of FIG. 2 is substantially the same as that of FIG. 1, except that the width is longer (of any optional width), the aerator box 4 rests on the cell floor 7, and a collection chute 10 for non-float, or sink, material with adjustable valve 11 permits continuous operation.

Figure 3:
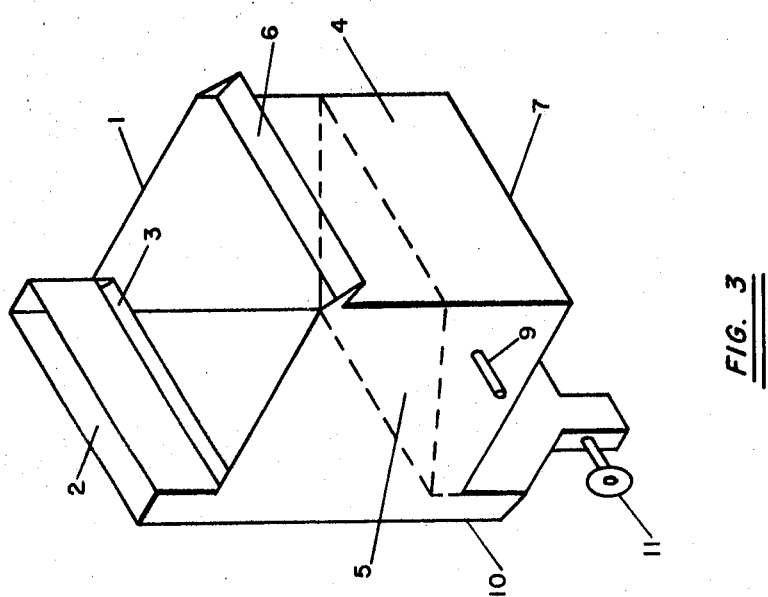

The cell of FIG. 3 is like that of FIG. 2 except that the aerator plate 5 slopes to the feed end of the cell, whereby the non-float material is deposited in the collection chute 10 at the end.

Figure 4:
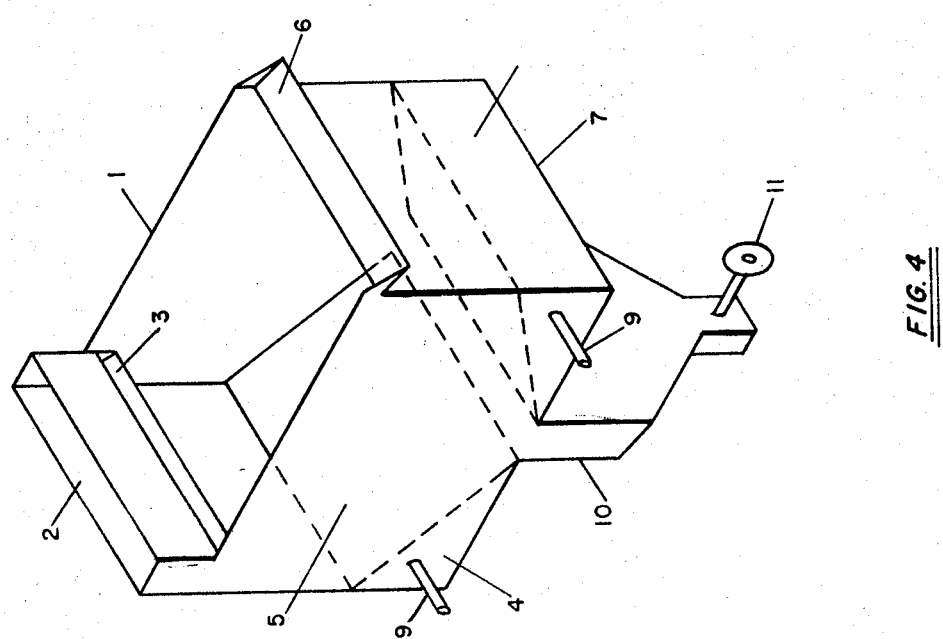

The cell of FIG. 4 is similar to that of FIGS. 2 and 3, except that the aerator box is divided to deposit non-float material in a central chute 10.

Figure 5:
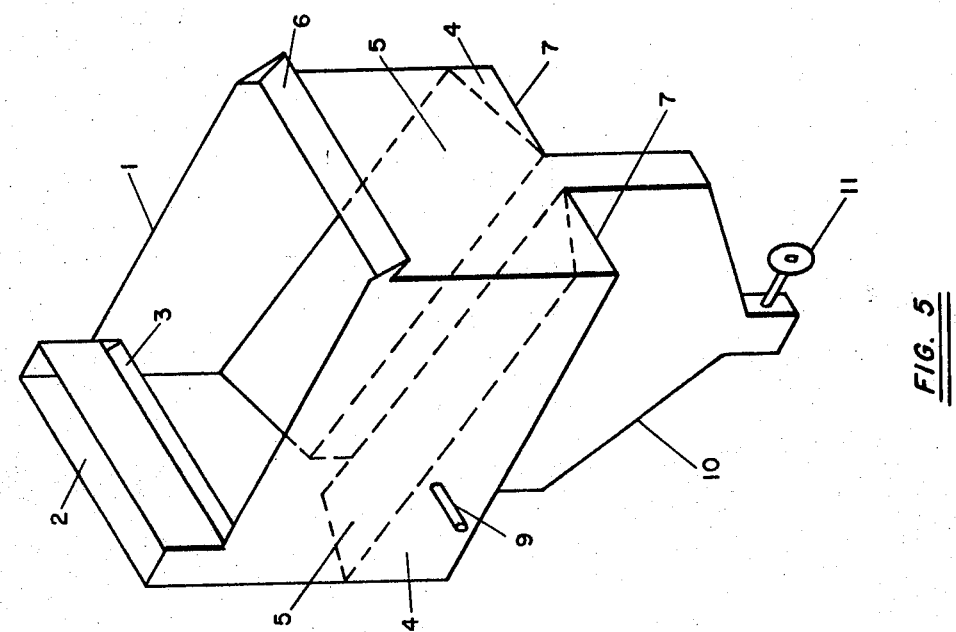

In FIG. 5 the aerator box is likewise divided, and has a double slope, i.e., to the center and forward.

Figure 6:
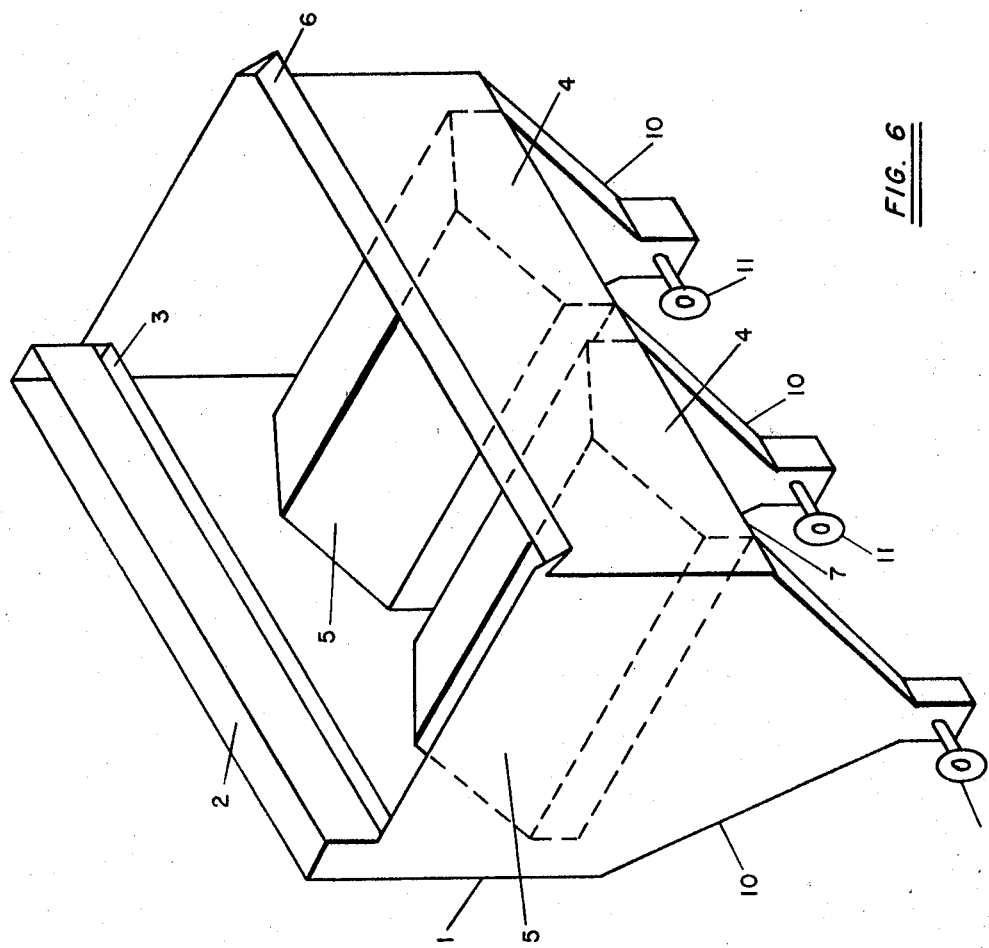

In FIG. 6 the cell operates substantially the same as those of the preceding figures, except that a plurality of aerator boxes is used, each having aerator plates sloping downward on either side. In this figure the air inlets (one for each aerator box) are at the back of the cell and are not shown.

The aerator unit per se may take various forms, and the aerator plate may be given various configurations.

In one preferred embodiment the unit may be divided into a plurality of air compartments, each receiving air under pressure. This embodiment is shown in FIG. 7. This results in somewhat greater uniformity in the rate of bubble flow in any given area of the plate, regardless of the head of water over that area, and furthermore permits further substantial reduction in the amount of frothing agent.

The feed box 2 of the cell may take varied forms. In the preferred form, the feed box is constructed so that the feed does not "plunge" through the feed box deep into the cell water. Preferably, the construction should be such that the feed emerging from the feed box simply pushes out on to the froth layer. The feed box as shown at 2, FIG. 1, meets this requirement. Another suitable embodiment of the feed box is shown in FIG. 8. In that figure, the feed path is arcuate, and the feed enters the cell at a tangent to the froth layer. As shown in FIG. 8, water may be added through water feed 12 to aid the forward flow of the feed into the cell.

The cell of FIG. 1 is used as follows:

First, the cell is filled with water. Next a small amount of frother, e.g., pine oil, methyl isobutyl carbinol, or the like, is added. Air under pressure (about 3 p.s.i.g.) is forced into air inlet pipe 9. A good froth is immediately formed, and begins to flow over the lip of the weir 6. Next, the flotation feed, suitably any feed customary in the art, is fed uniformly into the inlet of the feed box inlet 2. The float material becomes immediately trapped in the froth layer and travels in its smoothly across the length of the cell to exit over the weir 6 into collection means (not shown). The non-float material sinks, falls to the aerator plate 5, and slides off same to the bottom of the cell, whence it can be recovered by any suitable means (not shown).

The cell of FIG. 1 makes excellent batch separations when used as above.

The cells of FIGS. 2–6 are operated in substantially the same way as the cell in Example 1, except that the feed can be fed in continuously over an indefinite period, and the float material recovered continuously as it comes over the weir. The non-float material is removed continuously from the collection chute(s) 10 via valves(s) 11. The valve(s) 11 should be adjusted to prevent build-up of non-float material within the cell.

The novel cell and process of this invention offer several advantages over cells and processes of the prior art:

(1) The amounts of reagents required are generally reduced.

Flotation with conventional machines requires bubble-mineral contact, of course, and bubble-mineral attachment. The bubble(s) must then levitate the mineral particle to the froth, and removal of the froth accomplishes the separation of one or more kinds of minerals from the other mineral(s) in the pulp. It is believed that less reagents are required when employing the shallow air cell because, firstly, levitation is not required. Since levitation is not required, actually there do not have to be as many bubbles attached to the mineral particle and thus less reagent coating is needed. Secondly, the shallow air cell of this invention is much more quiet in the pulp zone. Therefore, bubble-mineral attachments are not subjected to the shearing forces present in conventional flotation machines, and again not as many bubble attachments are required. Thirdly, the large number of bubbles present enhance the probability of bubble-mineral contact, so that bubble attachment is enhanced without having as great an area of the mineral surface reagent coated.

(2) In many specific instances, when the cell and process of this invention is applied to well-known prior art froth flotation separations, the separations obtained are markedly superior. The comparisons involve using the standard prior art feed, standard prior art reagents, etc., the only differences being the use of the cell of this invention instead of the cells used commercially in the prior art. For example, under such controlled conditions, the cell of this invention gives improved recovery for the following froth flotation separations:

(a) phosphate pebble from quartz
(b) sylvite from halite, when handling plus 14 mesh material
(c) coal; gives a product with lower ash content
(d) copper (3) In general, a feed of larger mean particle size can be used in this invention than in prior art procedures, other conditions being the same. The reason for this is thought to be that the greater number of smaller bubbles provided in this invention, taken with the quiescent cell conditions, encourage the attachment of a plurality of bubbles to a given particle for a relatively long period of time, thereby greatly improving the probability that the particle will float, and stay floated long enough to exit in the froth. The quiescent conditions of the cell of this invention help prevent collisions between bubble-attached particles that tend to strip away bubbles already attached. This advantage (use of larger size feed) is found for example, in separations such as sylvite from halite, the two following being typical:

| Percent: | Mesh |
|---|---|
| 26.7 | 4 |
| 54.2 | 6 |
| 82.0 | 10 |

In this test overall recovery was 78% of the $K_2O$.

| Percent: | Mesh |
|---|---|
| 30.8 | 6 |
| 71.0 | 10 |

In this test overall recovery was 95.5% of the $K_2O$.

So far as is known, prior to this invention it was not possible to use such feeds in any commercial froth flotation for the recovery of sylvite.

Commercial phosphate flotation is typically carried out in two stages. In the first stage, phosphate is floated as rougher concentrate and sand removed as tailings and discarded. In the second stage, the rougher concentrate is treated so that most of its residual sand content floats, and phosphate sinks and is recovered as final product. A similar separation, using the cell and procedure of this invention, provides, inter alia, marked improvement with respect to $P_2O_5$ recovery and amounts of reagents required.

In flotation cells of the mechanically agitated type, although the net effect is that properly treated particles will become attached to one or more bubbles, nevertheless many forces are at work to knock the bubbles from the particles. The bubble-particle combination must survive shearing forces within the liquid, turbulence of the mass of particles and violent contact with the cell internals. The cell must be relatively deep (thereby requiring more water) to ensure that a given particle will have several opportunities to contact or re-contact the necessary bubbles. Problems of this sort are not encountered in the cell of this invention, since the contents of the cell are not mechanically agitated. In contrast, it is an inherent characteristic of the process of my invention that the float material does not sink into the cell water, but rather is carried across the surface by the multiplicity of bubbles on the froth layer until it leaves the cell at the overflow. In addition to providing superior separation of conventional ore feeds, this type of action, as already noted, also permits floating unusually large particles, e.g., −3+6 mesh sylvinite, which are not floatable, so far as I am aware, in any conventional cell of the prior art. This action, however, has no substantial entraining action on the non-float material, which sinks quietly down through the up-streaming bubbles.

The following examples illustrate without limiting the apparatus and process of this invention.

EXAMPLE 1

Potash flotation

Using the above described process and the apparatus of FIG. 1, potash (KCl) was recovered by froth flotation from a commercially available Canadian potash ore.

Conditions and results for the recovery are given in the following table. Air pressure to the aerator box was about 3 p.s.i.g.

It will be noted that the flotation feed was first scrubbed for 2 minutes, after which it was deslimed on a 20 mesh (Tyler) screen. The feed was scrubbed to loosen the slime (mostly montmorillonite clay) so that it no longer adhered to the feed particles.

After scrubbing, the feed is ready to be deslimed. In commercial operation, desliming is carried out in cyclones. In small lots in a laboratory it may be done by placing the product on a screen and washing with a stream of brine (saturated with respect to both KCl and NaCl), whereby the slime is washed through the screen. The deslimed product is then ready to be conditioned. For this operation, a pulp is made up by the addition of sufficient brine to the crude feed so that the pulp contains about 60% solids. Conditioning is conveniently carried out in a horizontal mixer, on rolls. Potato starch is first added, at the rate of 0.5 pound per ton of solids. This material is a "slime binding agent," which is to say, it fills up the interstices between any residual montmorillonite plates so that the amine (next added) cannot penetrate and therefore cannot activate the montmorillonite. The main reason for using starch is to reduce the amine consumption, starch, of course, being much less costly than amine. In many potash ores, if starch weer not used, the consumption of amine might be as much as 5 or 6 times as great. After conditioning with starch for about ½ minute, the amine is then added.

In this instance the amine was Armac TD, a commercially available long chain amine, being the acetate salt of an 18 carbon monoamine. The conditioning with this amine was carried out for 1 minute, the amount of amine being 0.5 pound per ton of ore.

As is well known in the potash flotation art, the amine is the collector which preferentially coats the surfaces of the potash particles and not the salt (or halite) particles. The hydrocarbon oil is not required when floating potash minus 14 mesh, but is required when floating coarser particle potash because the oil acts as an extender.

Flotation when employing an amine comes about when the amine concentration is great enough to form micelles. Now, the concentration of amine required for micellization can be reduced if an oil hydrocarbon is also in the system, because the oil molecules will become a part of the amine micelles, filling in spaces between the amine molecules. Thus, the oil, which is a cheap reagent, acts as an extender for the amine which is a higher cost reagent. For the flotation of large particle potash, more reagentization is needed because a larger percentage of the mineral surface must be coated with reagent to bring about flotation.

In some cases the oil and amine are not added together. Some practitioners add the amine first (to preferentially coat the potash), then add the oil. A good alternate method is to emulsify the oil and amine and add them to the pulp to be conditioned.

The oil used in the instant example is available commercially under the trademark "Provalent." It was added simultaneously with the amine, at the rate of 1 pound per ton of ore. Simultaneously 0.06 pounds of methyl isobutyl carbinol (MIBC) per ton of ore was added as frothing agent. The conditioned feed pulp was then removed from the conditioning vessel and was fed into the feedbox of the flotation apparatus.

The pulp feed was fed to the flotation apparatus at the rate of about 700 grams per minute. As will be noted from the table, recovered product was 52.6 weight percent of the starting feed and contained 95.5% of the total potash. There was only 4.5% $K_2O$ in the tails, which were mostly NaCl.

In the tables and data following, the terms "Head, assay" and "Head (or feed), calculated" are used in the sense customary in the flotation art, to wit:

A given representative sample of feed is weighed and analyzed chemically for a given chemical constituent (or constituents) prior to flotation. This analysis is "Head, assay."

"Head, calculated" is determined and used as follows: After flotation, the weight of the concentrate and tailings are added together to give the weight of "Head, calculated," which by definition is always taken as 100 weight percent. In other words, "Head, calculated" is a figure obtained by working backward from the recovered concentrate and tails. As such, it will rarely be identical to "Head, assay," since it will reflect a certain amount of inevitable losses in the cycle, and in addition may be subject to small experimental errors and/or variations in measurement of both "Head, assay" and "Head, calculated." Nevertheless it serves as a useful check on the efficiency of the overall operation. The weight percents of the concentrate and tails are based on the weight of "Head, calculated," and of course, by definition, their sum will give 100%. The total weight percent distribution of a given constituent in the concentrate and tail respectively is calculated with respect to the value of 100% distribution for the "Head, calculated."

TABLE I

Sample: 525 grams of −4+20 mesh Canadian potash ore

| | Conditions | | Reagents, lb. per ton of Ore | | | |
|---|---|---|---|---|---|---|
| | Time, Min. | Solids, Percent | Potato Starch | Armac TD | Pro-valent | MIBC [1] |
| Scrub | 2 | 60 | | | | |
| Deslime on a 20 mesh screen: | | | | | | |
| Condition | 0.5 | 60 | 0.5 | | | |
| Condition | 1.0 | 60 | | 0.5 | 1.0 | 0.06 |
| Flotation | | | | | | |

RESULTS

| Product | Weight, Percent | Chemical Analysis K₂O, Percent | Percent Distribution K₂O |
|---|---|---|---|
| Head (Assay) | | 33.7 | |
| Head (Calculated) | 100.0 | 34.42 | 100.0 |
| Concentrate: | | | |
| +6 Mesh | 14.2 | 63.19 | 26.0 |
| −6+10 Mesh | 22.1 | 62.65 | 40.4 |
| −10 Mesh | 16.3 | 61.75 | 29.1 |
| Total Concentrate | 52.6 | 62.52 | 95.5 |
| Tail: | | | |
| +6 Mesh | 16.6 | 7.87 | 3.8 |
| −6+10 Mesh | 18.1 | 1.13 | 0.6 |
| −10 Mesh | 12.7 | 0.16 | 0.1 |
| Total Tail | 47.4 | 3.23 | 4.5 |

[1] MIBC (methyl iso-butyl carbinol) was additionally added in the flotation cell in the amount of 30 mg./liter of brine.

EXAMPLE 2

Phosphate rock flotation

Using the apparatus of FIG. 1 and procedure of this invention, a crude phosphate rock feed was purified by froth flotation. This is a typical commercially available Florida phosphate matrix consisting essentially of phosphate rock and quartz.

The crude feed was first deslimed by washing. The deslimed feed was then conditioned for 5 minutes with Acintol FA2 (a commercially available tall oil), number 2 fuel oil, and methyl isobutyl carbinol, in the amounts shown in the table. The thus conditioned pulp feed was then floated in the apparatus of FIG. 1, to provide a rougher concentrate (phosphate rock) and a rougher tail. The rougher concentrate (phosphate rock) was recovered, the reagents removed with sulfuric acid in the conventional way, then deslimed, then conditioned with fuel oil, methyl isobutyl carbinol, caustic soda, and amine, and again floated to remove more quartz in a second step involving reverse flotation, wherein the quartz is floated and the phosphate rock is recovered as non-float material, the latter being the final finished product.

EXAMPLE 3

Copper ore flotation

Using the apparatus of FIG. 1 and procedure of this invention a copper ore was treated by froth flotation, using the conditions and with the results as stated in Table III. The ore was ground in a rod mill together with the conditioning reagents until it was about 100% through 100 mesh. Flotation time was 2 minutes. Concentrate comprised 21.4% of the feed weight and contained 84.7% of the copper in the feed. The "Z-200" shown in the table is a commercially available sulfide collector made by the Dow Chemical Company. It is a thiono carbamate of the following formula

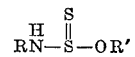

in which R and R' are long chain hydrocarbon groups.

TABLE II

Sample: 615 grams (wet) of a typical Florida phosphate matrix, −16+150 mesh

[Air pressure, 3.0 p.s.i. Temp., 70–75° F. Added 30 mg. MIBC/liter in cell]

| | Conditions | | Reagents, Lb. per ton of Ore | | | | | |
|---|---|---|---|---|---|---|---|---|
| | Time, Min. | Solids, Percent | Acintol FA2 | Fuel Oil No. 2 | MIBC | NaOH | Armac TD | H₂SO₄ |
| Deslime by washing: | | | | | | | | |
| Condition | 5 | 60 | 1.0 | 0.5 | 0.08 | | | |
| Flotation | | | | | | | | |
| Agitate | 1 | 60 | | | | | | 5.0 |
| Deslime by washing: | | | | | | | | |
| Condition | 5 | 60 | | 0.14 | 0.08 | 0.013 | 0.20 | |
| Flotation | | | | | | | | |

RESULTS

| Product | Weight, Percent | Chemical Analysis | | Percent Distribution | |
|---|---|---|---|---|---|
| | | BPL, Percent | SiO₂, Percent | BPL | SiO₂ |
| Head (Assay) | | 33.87 | 61.2 | | |
| Head (Calculated) | 100.0 | 34.09 | | 100.0 | |
| Rougher tail | 33.3 | 6.62 | | 6.5 | |
| Cleaner tail | 23.6 | 9.05 | | 6.2 | |
| Concentrate (Total) | 43.1 | 69.05 | 13.7 | 87.3 | [1] 9.6 |

[1] Calculated value.

TABLE III

Sample: 500 grams of a copper ore at 8 mesh size

[Air pressure, 4.0 p.s.i. Added an additional 30 mg./pine oil per liter in cell]

| | Conditions | | Reagents, Lbs. per ton of Ore | | |
|---|---|---|---|---|---|
| | Time, Min. | Solids, Percent | Ca(OH)$_2$ | Z-200 | Pine Oil |
| Grind in rod mill | 10 | 60 | 7.0 | 0.30 | 0.056 |
| Flotation | 2 | | | | |

RESULTS

| Product | Chemical Analysis Cu, Percent | Percent Distribution Cu | Weight, Percent |
|---|---|---|---|
| Head (Assay) | 2.06 | | |
| Head (Calculated) | 2.20 | 100.0 | 100.0 |
| Float | 8.70 | 84.7 | 21.4 |
| Non-Float | 0.427 | 15.3 | 78.6 |

EXAMPLE 4

Copper ore flotation

The general process and apparatus of the preceding example were used.

The copper ore used was a standard commercial crude ore, commonly referred to as a South American copper ore. It contains copper primarily as the sulfide, but with some (about 0.2%) oxide copper. In standard commercial practice the crude ore is crushed, then ground in ball mills for about 10 minutes to give a flotation feed of essentially −100 mesh. In the instant example the same material was ground for only half the usual time, namely, about 5 minutes, giving a feed of −48 mesh. Following conventional commercial practice, water and conditioning agents were added preceding grinding. Enough water was added to give a 50% solids pulp density in the grinding mill. The conditioning agents were Z-200 (as described in Example 3) 0.25 lbs./ton of feed; Ca(OH)$_2$ 7.0 lbs.; and pine oil 0.2 lbs. The residence time of the feed in the cell was only 4 minutes, about ¼ the time required in commercial practice, wherein a mechanical cell oft he agitator type is normally used. The feed weighed 497.2 g., solids basis. The floated concentrate weighed 109.5 g. and analyzed 9.58% Cu. The concentrate thus produced contained 89.0% of the Cu in the feed, the tailings 11.0.

Results are shown in Table IV.

TABLE IV

| | Conditions | | | Reagents, Lbs. per ton of Ore | | |
|---|---|---|---|---|---|---|
| | Time, Min. | Percent Solids | pH [1] S or F | Z-200 | Ca(OH)$_2$ | Pine Oil |
| Grind | 5 | 50 | 9.2 | 0.25 | 7.0 | 0.2 |
| Flotation | 4 | | | | | |

RESULTS

| Product | Weight, gms. | Weight, Percent | Chemical Analysis Percent Cu | Distribution Percent Cu |
|---|---|---|---|---|
| Feed (Calculated) | 497.2 | 100.0 | 2.48 | 100.0 |
| Concentrate | 109.5 | 22.0 | 9.58 | 89.0 |
| Tailings | 387.7 | 78.0 | 0.35 | 11.0 |

[1] S or F means start or finish. Air volume to cell was 0.562 ft.$^3$/min. 25 drops pine oil also added to cell.

As has been mentioned, the use of the shallow cell of this invention provides markedly superior results in the flotation of feeds containing a substantial fraction of coarse particles. This is demonstrated in the two following runs, tabulated below as Examples 5 and 6, using a coarse potash feed containing more than 25% of particles in the −4+6 mesh range and more than 40% in the −6+10 mesh range, and the balance −10+20 mesh (Tyler screen). In the past, such feed was not amendable to effective froth flotation by any known flotation cell. In this connection, it is known that −6 mesh potash ore feed is used in some plants, but recovery is so poor that the tails are subjected to further size reduction and additional flotation.

TABLE V.—FLOTATION OF COARSE PARTICLE POTASH(−4+20 MESH TYLER SCREEN)

| Example | Flotation Machine Employed | Reagents lb./ton of Ore | | Concentrate | | |
|---|---|---|---|---|---|---|
| | | Armac TD | Pro-valent | Weight, percent | Chemical Analysis K$_2$O, percent | Percent Distribution K$_2$O |
| 5 | Shallow Air | 0.5 | 1.0 | 52.6 | 62.52 | 95.5 |
| 6 | Control [1] | 0.5 | 1.0 | 20.5 | 60.00 | 34.5 |

[1] A Conventional laboratory cell of the mechanically agitated type.

A screen analysis of recovered concentrates and tailings showed that the cell of this invention gave markedly superior recoveries in each of the aforesaid mesh ranges, compared to results with a conventional cell. See Table VI below.

TABLE VI.—POTASH RECOVERY BY SIZE FRACTIONS

| | Percent Distribution in Size Fraction K$_2$O | | | | | |
|---|---|---|---|---|---|---|
| | Concentrate | | | Tailing | | |
| Example | −4+6 Mesh | −6+10 Mesh | −10+20 Mesh | −4+6 Mesh | −6+10 Mesh | −10+20 Mesh |
| 5 | 87.2 | 98.6 | 99.8 | 12.8 | 1.4 | 0.2 |
| 6 | 1.2 | 26.4 | 73.3 | 98.89 | 73.6 | 26.7 |

A series of four comparative runs were made (Tables VII–X below), each comparing performance of the process and the cell of this invention as shown in FIG. 1 with that of a standard agitation type laboratory flotation cell, on froth flotation of a commercial phosphate ore (containing quartz impurity). The technique used was the standard "antionic cationic" flotation procedure used commercially in phosphate rock flotation, for example, in Florida. Reagents and conditions were varied slightly from run to run. It will be noted that the best performance in the mechanical cell was inferior to the worst performance using the cell of this invention.

TEBLE VII. ANIONIC-CATIONIC FLOTATION OF PHOSPHATE ORE

Feed (both tests): 615 grams (wet) of unsized (−16+150M) typical Florida phosphate rock matrix

TEST CONDITIONS (BOTH TESTS)

| | Time, Min. | Solids, percent | pH Finish | Reagents, lb./ton of ore | | | | | |
|---|---|---|---|---|---|---|---|---|---|
| | | | | Acintol FA-2 | Fuel Oil No. 2 | MIBC | NaOH | Armac TD | H₂SO₄ |
| Deslime by washing: | | | | | | | | | |
| Condition | 5 | 60 | 7.5 | 1.0 | 0.5 | 0.08 | ¹ 0.01 | | |
| Flotation | 1.0 | | | | | | | | |
| Agitate | 1 | 60 | | | | | | | 5.0 |
| Deslime by washing: | | | | | | | | | |
| Condition | 1 | 20 | | | 0.21 | 0.08 | | 0.25 | |
| Flotation | 0.7 | | | | | | | | |

¹ Used for pH control.

RESULTS

| Flotation Test No. | Flotation Machine Employed | Concentrate | | |
|---|---|---|---|---|
| | | Weight percent | Chemical Analysis BPL percent | Percent Distribution BPL |
| 7 | Shallow Air | 39.9 | 72.76 | 86.4 |
| 8 | Mechanical Cell | 22.3 | 74.95 | 54.6 |

TABLE VIII.—ANIONIC-CATIONIC FLOTATION OF PHOSPHATE ORE

Test charge (both tests) 615 grams (wet) of −16+35M typical Florida phosphate rock matrix

CONDITIONS

| | Time, Min. | Solids, percent | pH Finish | Reagents, lb./ton of ore | | | | | |
|---|---|---|---|---|---|---|---|---|---|
| | | | | Acintol FA-2 | Fuel Oil No. 2 | MIBC | Armac TD | H₂SO₄ | NaOH |
| Deslime by washing: | | | | | | | | | |
| Condition | 5 | 60 | 7.7 | 1.0 | 0.5 | 0.08 | | | 0.08 |
| Flotation | 1 | | | | | | | | |
| Agitate | 1 | 60 | | | | | | 5.0 | |
| Deslime by washing: | | | | | | | | | |
| Condition | 1 | 20 | 7.4 | | 0.21 | 0.08 | 0.25 | | 0.12 |
| Flotation | 0.6 | | | | | | | | |

RESULTS

| Flotation Test No. | Flotation Machine Employed | Weight percent | Chemical Analysis BPL, Percent | Distribution BPL |
|---|---|---|---|---|
| 9 | Shallow Air | 43.9 | 77.79 | 94.7 |
| 10 | Mechanical Cell | 27.8 | 75.60 | 55.0 |

TABLE IX.—ANIONIC-CATIONIC FLOTATION OF PHOSPHATE ORE

Test charge (both tests): 615 grams (wet) of unsized (−16+150M) typical Florida phosphate rock matrix

TEST CONDITIONS (BOTH TESTS)

| | Time, Min. | Solids, Percent | pH Start | pH Finish | Reagents, lb./ton of ore | | | | | |
|---|---|---|---|---|---|---|---|---|---|---|
| | | | | | Acintol FA-2 | Fuel Oil No. 2 | MIBC | NaOH | Armac TD | H₂SO₄ |
| Deslime by washing: | | | | | | | | | | |
| Condition | 5 | 60 | | 7.5 | 1.0 | 0.5 | 0.08 | | | |
| Flotation | 0.9 | | 7.7 | | | | | | | |
| Agitate | 1 | 60 | | | | | | | | 5.0 |
| Deslime by washing: | | | | | | | | | | |
| Condition | 5 | 60 | | | | 0.14 | 0.08 | 0.013 | 0.20 | |
| Flotation | 0.9 | | | | | | | | | |

RESULTS

| Flotation Test No. | Flotation Machine Employed | Concentrate | | |
|---|---|---|---|---|
| | | Weight, Percent | Chemical Analysis BPL, Percent | Percent Distribution BPL |
| 11 | Shallow Air | 43.1 | 69.05 | 87.3 |
| 12 | Mechanical Cell | 39.2 | 55.72 | 72.0 |

TABLE X.—ANIONIC-CATIONIC FLOTATION OF PHOSPHATE ORE
Test charge (both tests): 640 grams (wet) of −35+150M typical Florida phosphate rock matrix

CONDITIONS

| | Time, Min. | Solids, Percent | pH Finish | Reagents, lb./ton of ore | | | | | |
|---|---|---|---|---|---|---|---|---|---|
| | | | | Acintol FA-2 | Fuel Oil No. 2 | MIBC | Armac TD | $H_2SO_4$ | NaOH |
| Deslime by washing: | | | | | | | | | |
| Condition | 5 | 60 | 7.7 | 0.5 | 0.5 | 0.08 | | | 0.04 |
| Flotation | 1.4 | | | | | | | | |
| Agitate | 1 | 60 | | | | | | 5.0 | |
| Deslime by washing: | | | | | | | | | |
| Condition | 1 | 20 | 7.8 | | 0.07 | 0.08 | 0.10 | | 0.12 |
| Flotation | | | | | | | | | |
| Condition | 1 | 20 | 8.1 | | 0.07 | 0.08 | 0.10 | | 0.12 |
| Flotation | | | | | | | | | |

RESULTS

| | | | Concentrate | | |
|---|---|---|---|---|---|
| Flotation Test No. | Flotation Machine Employed | | Weight percent | Chemical Analysis BPL, Percent | Percent Distribution BPL |
| 13 | Shallow Air | | 33.2 | 77.13 | 92.2 |
| 14 | Mechanical Cell | | ¹ 2.2 | ¹ 58.10 | ¹ 4.7 |

¹ Rougher concentrate only. So little material was floated during rougher flotation, that the rougher concentrate was not subjected to cleaning.

A further comparison was made, again on phosphate ore, using straight "anionic" flotation. The results are given in Table XI below. This technique is used commercially on some phosphate rock feeds that do not respond well to the more usual "anionic-cationic" flotation. Results in the cell of this invention were excellent, but results with the standard mechanical cell were quite poor. While the conditions of this example would obviously never be used commercially with a mechanical cell, the results do show clearly that the shallow cell of this invention is much less affected by what would otherwise be considered adverse flotation conditions.

TABLE XI—STRAIGHT ANIONIC FLOTATION OF PHOSPHATE ORE
Test charge (both tests): 630 grams (wet) of unsized (−16+150M) typical Florida phosphate rock matrix

CONDITIONS

| | Time, Min. | Solids, Percent | pH Finish | Reagents, lb./ton of ore | | | |
|---|---|---|---|---|---|---|---|
| | | | | Acintol FA-2 | Fuel Oil No. 2 | MIBC | $Na_2SiO_3$ |
| Deslime by washing: | | | | | | | |
| Condition | 5 | 60 | 7.5 | 1.0 | 0.5 | 0.08 | 1.5 |
| Rougher Flotation | 0.6 | | | | | | |
| Condition | 5 | 60 | 7.5 | 0.1 | 0.05 | 0.08 | 0.25 |
| Cleaner Flotation | 0.7 | | | | | | |
| Condition | 5 | 60 | 7.6 | 0.1 | 0.05 | 0.08 | 0.25 |
| Recleaner Flotation | | | | | | | |

RESULTS

| Flotation Test No. | Flotation Machine Employed | Weight Percent | Chemical Analysis BPL, Percent | Percent Distribution BPL |
|---|---|---|---|---|
| 15 | Shallow Air | 41.8 | 72.76 | 88.7 |
| 16 | Mechanical Cell | 7.2 | 75.60 | 16.0 |

NOTE.—In Flotation Test No. 16, recleaner flotation was not employed since insufficient material remained to process further.

I claim:

1. In the method of froth flotation of a feed comprising material to be floated as concentrate to a froth exit and material to be depressed as tailings, wherein the froth is formed by causing small air bubbles to rise through water containing a frothing agent, the improvement comprising:
   (a) generating said bubbles by forcing air under pressure through an aerator plate having orifices for the passage of air, said orifices having a mean diameter of 2 to 65 microns, said air pressure being 1 to 10 p.s.i.g., the concentration of orifices in the said aerator plate being sufficient to provide a volume of air passing through the plate at a rate of 0.004 to 0.05 cubic feet per square inch of aerator surface per minute at standard conditions, there being substantially no agitation other than from such bubbles;
   (b) providing a mean depth of water over the aerator plate of 4 to 12 inches;
   (c) laying the feed down gently at the feed entrance in the layer of froth; and
   (d) providing a flow path for substantially all the froth measuring about 4 to 18 inches from the feed entrance to the froth exit.

2. The method according to claim 1 in which the mean diameter of the orifices in the aerator plate is about 5 microns.

3. The method according to claim 2 in which the air pressure is about 3 p.s.i.g.

4. The method according to claim 1 in which the feed is a mixture of phosphate rock and quartz.

5. The method according to claim 1 in which the feed is a mixture of sylvite and halite.

6. The method according to claim 1 in which the feed is a mixture of copper sulfide, copper oxide, and gangue minerals comprising principally quartz.

7. In a froth flotation process for a particulate ore feed comprising a float portion and a sink portion and susceptible of benefication by froth flotation, the improvement comprising:
   (a) forming a froth layer from a bubble source submerged under at least 4 but not more than about 12 inches of water in the absence of agitation other than that given the water by the rising bubbles, said bubble source extending under and across substantially the entire water area and consisting of air orifices of 2–65 microns mean diameter and being the sole effective bubble source contributing to the formation of said froth layer;
   (b) causing the layer to move from ore feed zone to a froth exit zone by overflow at the latter zone, substantially all the overflow being about 4–18 inches from the ore feed zone;

(c) charging said ore feed to said feed zone into said froth layer, whereby the float portion of said feed is trapped in said froth layer without substantial submersion in the water below the froth layer and the sink portion of said feed sinks into the water below the froth layer;

(d) and separately recovering said float and sink portions.

8. A froth flotation cell comprising
(a) a vessel;
(b) ore feed mean on said vessel;
(c) a froth overflow weir opposite said ore feed means;
(d) an aerator chamber at the bottom of said vessel, said chamber having:
 (i) air inlet means;
 (ii) an aerator plate with orifices having a mean diameter ranging from 2 to 65 microns and being positioned an average distance of 4 to 12 inches below the said weir, said plate sloping sufficiently to cause sink material to slide off same during a froth flotation operation.

9. The cell according to claim 8 in which the aerator plate is flat and slopes at an angle of about 30° from horizontal.

10. The cell according to claim 8 in which the aerator plate is an average distance of 6 inches below the weir.

11. The cell according to claim 8 in which the ore feed means is arcuately contoured and adapted to deliver ore feed into the cell in a plane substantially level with the weir.

12. The cell according to claim 8 in which the aerator chamber is divided into a plurality of compartments, each with its individual air inlet.

References Cited

UNITED STATES PATENTS

| | | | |
|---|---|---|---|
| 1,889,078 | 11/1932 | Schiechel | 261—121 |
| 1,579,722 | 4/1926 | McAfee | 209—170 |
| 835,120 | 11/1906 | Sulman | 209—166 |
| 1,331,238 | 2/1920 | Callon | 209—170 |
| 2,267,496 | 12/1941 | Ellis | 209—170 X |
| 2,753,045 | 7/1956 | Hollingsworth | 209—170 |

OTHER REFERENCES

Eng & Min. J. Fuerstenau, 165, No. 11, pp. 108, 109, November 1964.

HARRY B. THORNTON, Primary Examiner

R. HALPER, Assistant Examiner

U.S. Cl. X.R.

209—170

PO-1050
(5/69)

UNITED STATES PATENT OFFICE
CERTIFICATE OF CORRECTION

Patent No. 3,455,451        Dated July 15, 1969

Inventor(s) Paul R. Smith, Jr.

It is certified that error appears in the above-identified patent and that said Letters Patent are hereby corrected as shown below:

In the specification, Column 4, about line 65, just over the word "Mesh" insert -- On --.

Column 7, TABLE I, line 2 of the TABLE, delete the colon after "screen" and move the words "Condition", "Condition", and "Flotation" back to the same margin with "Deslime".

Column 7, TABLE II, lines 1 and 5 of the TABLE, Column 11, TABLE VII, lines 1 and 5 of the TABLE, Column 11, TABLE VIII, lines 1 and 5 of the TABLE, and Column 11, TABLE IX, lines 1 and 5 of the TABLE, each occurrence, delete the colon after "washing" and move the words "Condition", "Flotation", "Agitate" "Condition", and "Flotation" in lines 2, 3, 4, 6, and 7 of the TABLE back to the same margin with "Deslime".

Column 11, TABLE VII, correct the spelling of the word "TABLE".

Column 13, TABLE X, lines 1 and 5 of the TABLE, delete the colon after "washing" and move the words "Condition", "Flotation", "Agitate", "Condition", "Flotation", "Condition", and "Flotation", lines 2, 3, 4, 6, 7, 8, and 9, back to the same margin with "Deslime".

Column 13, TABLE XI, line 1, delete the colon after "washing" and move the words "Condition", "Rougher Flotation", "Condition", "Cleaner Flotation", "Condition", and "Recleaner Flotation", back to the same margin with "Deslime".

In the Claims, Column 15, line 11, Claim 8 (b), change the word "mean" to -- means --.

SIGNED AND
SEALED
MAY 26 1970

(SEAL)
Attest:

Edward M. Fletcher, Jr.
Attesting Officer

WILLIAM E. SCHUYLER, JR.
Commissioner of Patents